July 1, 1924.
C. A. KLOPPENBURG
1,500,080
PROCESS AND DEVICE FOR PREPARING ALCOHOLS AND ALDEHYDES FROM HYDROCARBONS
Filed July 26, 1922
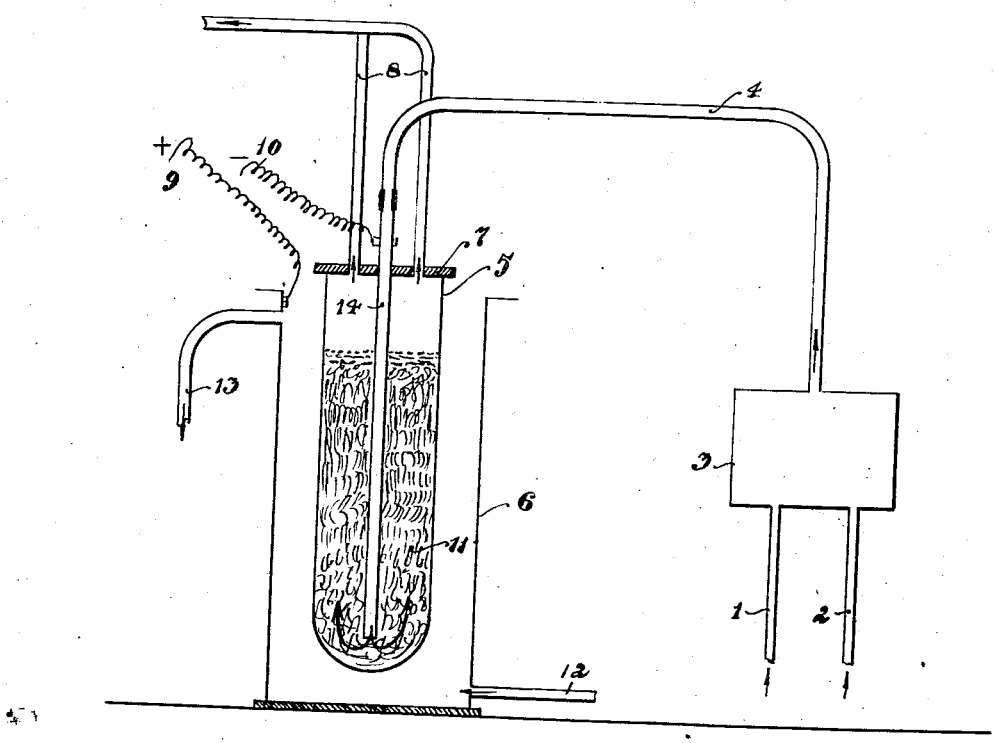

Patented July 1, 1924.

1,500,080

UNITED STATES PATENT OFFICE.

CAROLUS A. KLOPPENBURG, OF TJEPOE, DUTCH EAST INDIES, ASSIGNOR TO NAAM-LOOZE VENNOOTSCHAP DE BATAAFSCHE PETROLEUM MAATSCHAPPIJ, OF THE HAGUE, NETHERLANDS.

PROCESS AND DEVICE FOR PREPARING ALCOHOLS AND ALDEHYDES FROM HYDROCARBONS.

Application filed July 26, 1922. Serial No. 577,672.

*To all whom it may concern:*

Be it known that I, Dr. CAROLUS ALBERTUS KLOPPENBURG, chemical technologist, residing at Tjepoe, Dutch East Indies, have invented certain new and useful Improvements in Processes and Devices for Preparing Alcohols and Aldehydes from Hydrocarbons, of which the following is a specification.

This invention relates to an improved process and to improvements in apparatus for preparing alcohols and aldehydes from hydrocarbons, especially from marsh-gas which for an important part consists of methane ($CH_4$).

Heretofore methylalcohol obtained by distillation of wood has been generally used for preparing formaldehyde and the processes in which other elementary products were applied were generally of no practical use.

The improved process according to this invention involves the use of methane, which is of much importance, as this gas is available in very large quantities and is to be obtained out of the earth at slight cost.

The oxidation of methane to formaldehyde may be represented by the following equation:

$$CH_4 + O \rightarrow CH_3OH + O \rightarrow CH_2O + H_2O.$$

The solution of the problem of transforming methane into formaldehyde meets however with important difficulties. As shown in the above mentioned formula the methane must first be transformed into methylalcohol, which then by means of a further oxidation (dehydrogenation) must be transformed into formaldehyde.

The formation of formaldehyde from methylalcohol in the presence of oxygen by means of catalyzers proceeds in the same way as in the absence of oxygen, and consists of a dehydrogenation of the methylalcohol. Probably the oxygen has only the secondary function of regenerating the catalyzer. When using copper as contact material a continuous formation of copperoxide takes place, which is reduced again to the active catalytic copper by combustion of alcohol, formaldehyde, carbonmonoxide and hydrogen.

The temperature at which the oxidation of methane to methyl alcohol results in a satisfactory way lies at about ±600° C. For the further oxidation of methylalcohol to formaldehyde however only a temperature of about 300° C. is required. The suitable temperature for the first oxidation is therefore much too high for the second one. At a temperature of ±600° C. the oxidation goes too far and only small quantities of formaldehyde will arise with large quantities of carbonmonoxide, hydrogen, carbondioxide and water.

As at the above temperature the speed of formation of $CH_3OH$ from $CH_4$ is less than the speed of decomposition of $CH_3OH$ it would be desirable, in connection with the stability of the methane, to use high temperatures for the formation of methylalcohol. However, as stated above, the quantity of the eventually obtained formaldehyde would decrease considerably.

It would therefore be necessary to execute a second reaction at a considerably lower temperature after the formation of methylalcohol. This invention enables me to prepare at one manipulation formaldehyde (and other aldehydes) and methylalcohol (and other alcohols) from methane (and other hydrocarbons) and to secure such an output as is renumerative in practice.

As regards the process the invention consists therein that hydrocarbons, after vaporization, mixed with oxygen or oxygen-containing gases, e. g. air, is led over a catalyzer. According to the invention there may be used e. g. as catalyzer an active or activated carbon, e. g. cocoanut-carbon. For methane a temperature of 35° C. or lower is applied, and is required, as considerable heat is evolved. By means of dark electric dischargings this process is carried up to the highest possible useful effect. If instead of methane another elementary material is used, the favorable temperature will be higher, but at any rate considerably below the temperatures used heretofore.

In the accompanying drawing which is a diagrammatic section a device constructed according to the invention is shown by way of example, which device is especially suitable for executing the above process.

1 and 2 are supply-tubes, one for the marsh-gas and the other for the oxygen or the oxygen-containing gas. The gases are dried before use in some well known way. 3 is a mixing chamber, in which the gases are mixed as thoroughly as possible, and from which they pass through the tube 4 to the vessel 5. The tube 4 is connected isolatedly as at 4ª with the tube 14, the latter terminating near to the bottom of the vessel 5. 6 is a larger container surrounding the vessel 5 and provided with a supply-tube 12 and an outlet-tube 13 for a cooling medium. The vessel 5 is provided with a cover 7 with openings for the supply tube 4 for the gas mixture, and for the outlet tube (or tubes) 8. The tube 8 finally leads to condensers and washers (not shown), where the resulting gas mixture is further treated. 9 and 10 respectively are the positive and negative conducting-wires of an induction-engine. 11 is the contact mass. The latter consists according to the invention e. g. of coal, obtained by dry distillation of cocoanut-shells.

If the cooling medium is water, convective discharges will occur between the water in the container 6 and the outer wall of the tube 14 by means of the catalyzer in the vessel 5.

The vessel 5 preferably consists of porcelain, quartz or other non-conducting material, the container 6 and the tube 14 of iron or other conducting substance.

The dry gases which meet in the mixing chamber 3, ascend through the catalytic mass, and are therefore subjected to convective discharges.

At the same time a formation of ozon takes place, while also the absorbing influence of the carbon acts favorably on the reactions. The gas-mixture leaving the apparatus through the tubes 8, consists of alcohol vapour, aldehyde, oxygen (and nitrogen), and eventually untransformed methane.

I claim:

1. A process for preparing alcohols and aldehydes according to which hydrocarbon containing gases are mixed with oxygen containing gases and are led at suitable temperature over carbonized cocoanuts, dark electric dischargings being applied for accelerating the process.

2. A process for preparing alcohols and aldehydes according to which hydrocarbon containing gases in a dry state are mixed with oxygen containing gases and are led at suitable temperature over carbonized cocoanuts, dark electric dischargings being applied for accelerating the process.

3. A process for preparing alcohols and aldehydes according to which hydrocarbon containing gases in a dry state are mixed with oxygen containing gases and are led at suitable temperature over carbonized cocoanuts, dark electric dischargings being applied for accelerating the process.

4. An apparatus for preparing alcohols and aldehydes comprising a vessel of a non-conducting material provided with a tube terminating near the bottom, the vessel being surrounded by a conducting container.

5. An apparatus for preparing alcohols and aldehydes comprising a vessel of a non-conducting material provided with a tube terminating near the bottom, the vessel being surrounded by a conducting container while the tube and the container may be loaded electrically.

6. An apparatus for preparing alcohols and aldehydes comprising a vessel of a non-conducting material provided with a tube terminating near the bottom, the vessel containing a catalytic mass being surrounded by a conducting container while the tube and the container may be loaded electrically.

In testimony whereof I affix my signature.

C. A. KLOPPENBURG.